(12) United States Patent
Nagato

(10) Patent No.: US 12,246,523 B2
(45) Date of Patent: Mar. 11, 2025

(54) PROCESSING METHOD, LAMINATOR SYSTEM, LAMINATOR, POST-PROCESSING APPARATUS, AND RECORDING MEDIUM

(71) Applicant: KONICA MINOLTA, INC., Tokyo (JP)

(72) Inventor: Hiromu Nagato, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 90 days.

(21) Appl. No.: 18/204,741

(22) Filed: Jun. 1, 2023

(65) Prior Publication Data
US 2023/0391060 A1 Dec. 7, 2023

(30) Foreign Application Priority Data

Jun. 7, 2022 (JP) ................................ 2022-092349

(51) Int. Cl.
*B32B 37/00* (2006.01)
*B32B 38/00* (2006.01)
*B32B 38/18* (2006.01)
*B32B 41/00* (2006.01)

(52) U.S. Cl.
CPC ...... *B32B 37/0053* (2013.01); *B32B 38/0004* (2013.01); *B32B 38/18* (2013.01); *B32B 41/00* (2013.01); *B32B 2037/0061* (2013.01)

(58) Field of Classification Search
CPC . B32B 2037/0061; B32B 41/00; B32B 38/18; B32B 38/0004; B32B 37/0053
See application file for complete search history.

(56) References Cited

U.S. PATENT DOCUMENTS

2011/0108197 A1\* 5/2011 Ohsawa ................. B65H 29/06
156/387

FOREIGN PATENT DOCUMENTS

| DE | 102016221527 A1 \* | 5/2018 | ......... B32B 37/0053 |
| JP | 2009-073668 A | 4/2009 | |
| JP | 2016-007854 A | 1/2016 | |

\* cited by examiner

*Primary Examiner* — Vishal I Patel
(74) *Attorney, Agent, or Firm* — Squire Patton Boggs (US) LLP

(57) ABSTRACT

A processing method includes, collectively performing laminate processing with a long laminate film on a plurality of continuously conveyed flat cut sheets; cutting the long laminate film after the laminate processing for each flat cut sheet and obtaining a laminated flat cut sheet; and performing post-processing on the laminated flat cut sheet. An end portion of the laminated flat cut sheet as a reference of the post-processing is the end portion on a side where the laminate film does not protrude from the end portion of each laminated flat cut sheet.

14 Claims, 10 Drawing Sheets

PROCESSING METHOD, LAMINATOR SYSTEM, LAMINATOR, POST-PROCESSING APPARATUS, AND RECORDING MEDIUM

REFERENCE TO RELATED APPLICATIONS

The entire disclosure of Japanese Patent Application No. 2022-092349 filed on Jun. 7, 2022, is incorporated herein by reference in its entirety.

TECHNICAL FIELD

The present invention relates to a processing method, a laminator system, a laminator, a post-processing apparatus, and a recording medium.

DESCRIPTION OF THE RELATED ART

Japanese Unexamined Patent Publication No. 2016-7854 and Japanese Unexamined Patent Publication No. 2009-73668 disclose the following laminating apparatus. More specifically, a laminating apparatus attaches a strip-shaped laminating film to a continuously conveyed sheet such that a rear end portion of a preceding sheet and a front end portion of a following sheet overlap each other by a predetermined amount. Thereafter, the laminating apparatus cuts the strip-shaped laminating film so as to separate the sheets one by one.

FIG. 11A shows an example in which a rear end portion of a preceding sheet P is overlapped on an upper portion of a front end portion of a following sheet P by a predetermined overlap amount, and the sheets P are continuously conveyed. FIG. 11B shows an example of the sheet P (laminated flat cut sheet Pa) on which laminate processing is performed obtained by attaching a laminate film (film F) to the continuously conveyed sheet P and cutting the film F. Arrows in FIGS. 11A and 11B indicate a conveying direction of the sheet P. In this case, the conveying direction leading end side of the laminated flat cut sheet Pa is in a state where the laminated flat cut sheet Pa protrudes (is exposed) from the leading end of the film F.

FIG. 12A shows an example in which the rear end portion of a preceding sheet P is overlapped with a lower portion of the front end portion of a following sheet P by a predetermined overlap amount and the sheets P are continuously conveyed. FIG. 12B illustrates an example of the sheet P (laminated flat cut sheet Pa) on which laminate processing is performed after a film F has been attached to the continuously conveyed sheet P and the film F has been cut. Arrows in FIGS. 12A and 12B indicate a conveying direction of the sheet P. In this case, the leading end side of the laminated flat cut sheet Pa in the conveying direction is in a state where the film F protrudes from the leading end of the laminated flat cut sheet Pa.

A description will be provided on a case where a system including a post-processing section for performing predetermined post-processing on a laminated flat cut sheet Pa on which laminate processing is performed performs the predetermined post-processing with reference to a conveying direction leading end of the laminated flat cut sheet Pa. In this case, the system includes a detecting section 321 for detecting the conveying direction leading end of the laminated flat cut sheet Pa (see FIGS. 11B and 12B).

SUMMARY OF THE INVENTION

In such a system, in the case illustrated in FIG. 11B, the detecting section 321 detects the leading end of the laminated flat cut sheet Pa. However, in the case shown in FIG. 12B, the detecting section 321 detects the leading end of the film F. In a case where the leading end of the film F is detected as illustrated in FIG. 12B, and predetermined post-processing is performed with reference to the leading end of the film F, there is a problem that accuracy of the post-processing is deteriorated.

Japanese Unexamined Patent Publication No. 2016-7854 and Japanese Unexamined Patent Publication No. 2009-73668 do not describe a system including a post-processing section on the downstream of a laminate processing section and cannot solve the above-described problem.

An object of the present invention is to provide a processing method, a laminator system, a laminator, a post-processing apparatus, and a recording medium that can more appropriately perform post-processing after laminate processing.

To achieve at least one of the abovementioned objects, according to an aspect of the present invention, a processing method reflecting one aspect of the present invention includes, collectively performing laminate processing with a long laminate film on a plurality of continuously conveyed flat cut sheets;

cutting the long laminate film after the laminate processing for each flat cut sheet and obtaining a laminated flat cut sheet; and performing post-processing on the laminated flat cut sheet, wherein an end portion of the laminated flat cut sheet as a reference of the post-processing is the end portion on a side where the laminate film does not protrude from the end portion of each laminated flat cut sheet.

According to another aspect of the present invention, a laminator system includes, a laminate processing section configured to collectively perform laminate processing with a long laminate film on a plurality of continuously conveyed flat cut sheets;

a cutting section configured to cut the long laminate film after the laminate processing for each flat cut sheet and obtain a laminated flat cut sheet; and a post-processing section configured to perform post-processing on the laminated flat cut sheet, wherein an end portion of the laminated flat cut sheet as a reference of the post-processing is the end portion on a side where the laminate film does not protrude from the end portion of each laminated flat cut sheet.

According to another aspect, a laminator includes:

a laminate processing section configured to collectively perform laminate processing with a long laminate film on a plurality of continuously conveyed flat cut sheets, wherein a laminated flat cut sheet is passed to a post-processing apparatus that performs post-processing on the laminated flat cut sheet on which the laminate processing is performed; and a cutting section that cuts the long laminate film for each flat cut sheet after the laminate processing before passing the laminated flat cut sheet to the post-processing apparatus, wherein the laminate flat cut sheet is passed to the post-processing apparatus in a state that an end portion of the laminated flat cut sheet as a reference of the post-processing is the end portion on a side where the laminate film does not protrude from the end portion of each laminated flat cut sheet.

According to another aspect, a post-processing apparatus includes:

a post-processing section that receives each laminated flat cut sheet in which, after collectively performing laminate processing with a long laminate film on a plurality of continuously conveyed flat cut sheets, the long laminate film is cut for each flat cut sheet after the laminate processing, and that performs post-processing on the laminate flat cut sheet, wherein an end portion of the laminated flat cut sheet as a reference of the post-processing is the end portion on a side where the laminate film does not protrude from the end portion of each laminated flat cut sheet.

According to another aspect, a non-transitory recording medium storing a computer-readable program for causing a computer included in a laminate system including, a laminate processing section configured to collectively perform laminate processing with a long laminate film on a plurality of continuously conveyed flat cut sheets; a cutting section configured to cut the long laminate film after the laminate processing for each flat cut sheet and obtain a laminated flat cut sheet; and a post-processing section configured to perform post-processing on the laminated flat cut sheet, to function as, a hardware processor that controls an end portion of the laminated flat cut sheet as a reference of the post-processing to be the end portion on a side where the laminate film does not protrude from the end portion of each laminated flat cut sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, embodiments of the present invention will be described in detail with reference to the drawings. However, the scope of the invention is not limited to the disclosed embodiments.

<1. Configuration of Laminator System>

Figure 1:
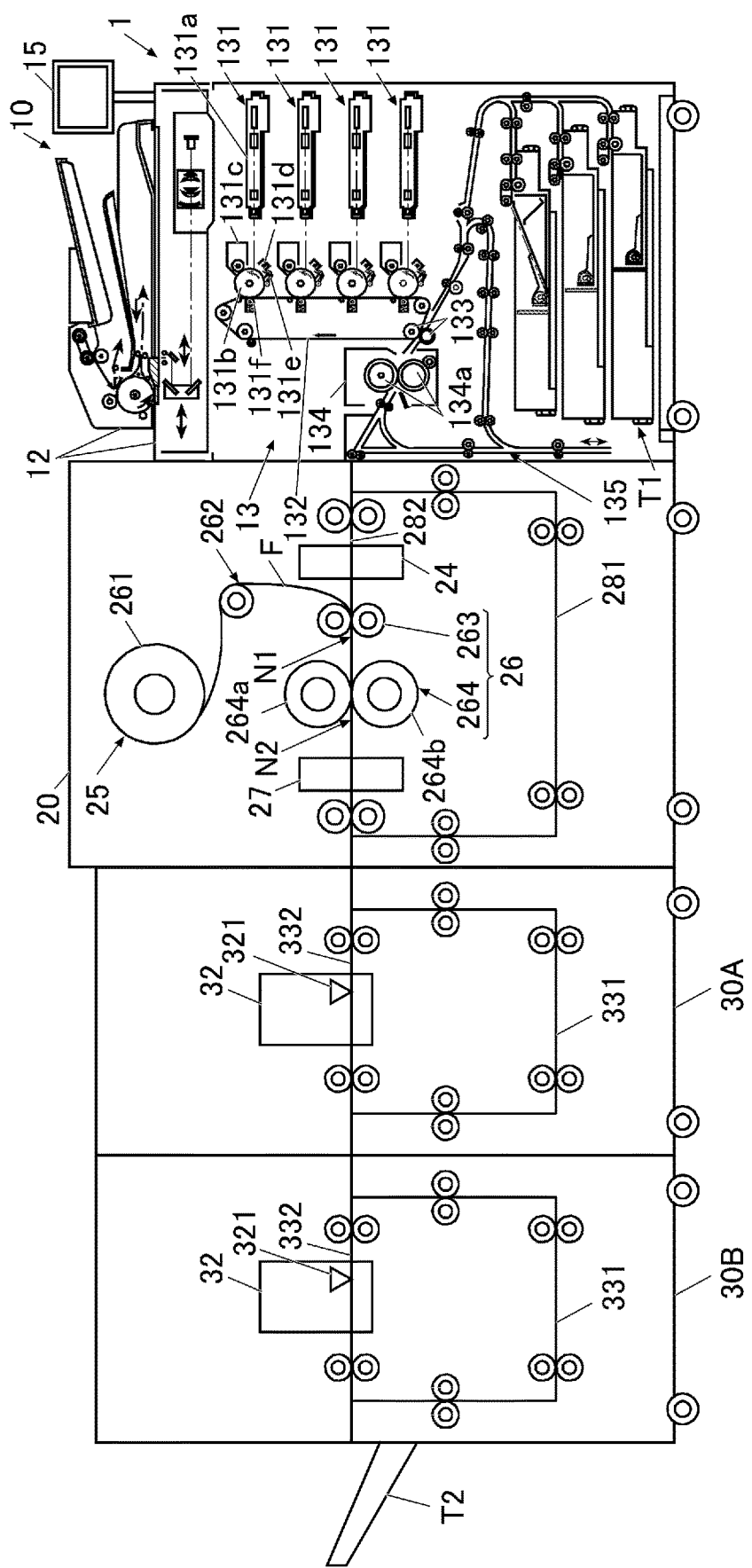
FIG. 1 is a front view illustrating a schematic configuration of a laminator system according to the present embodiment.
Figure 2:
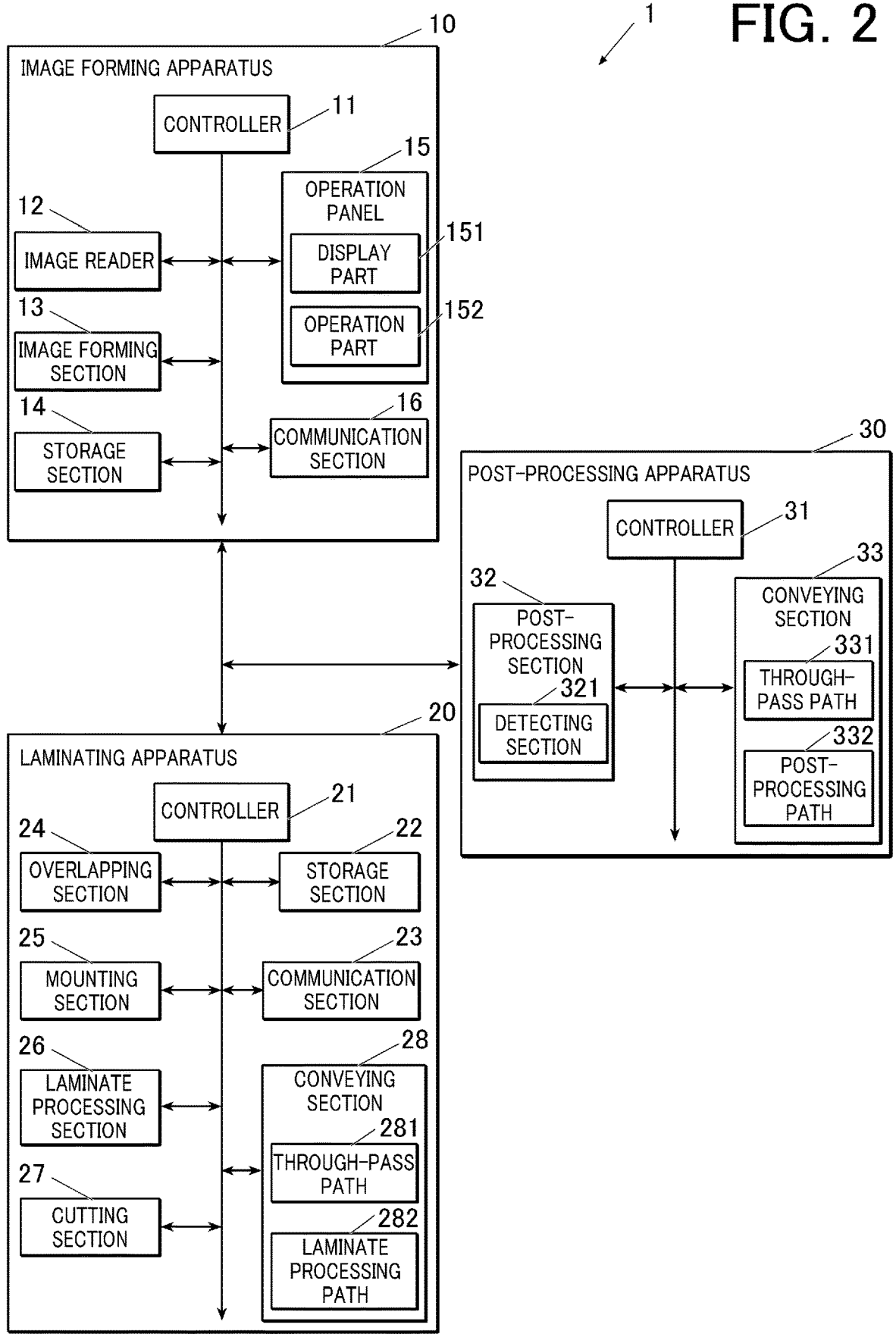
FIG. 2 is a functional block diagram illustrating a control structure of the laminator system according to the present embodiment.

As shown in FIGS. 1 and 2, the laminator system 1 according to the present embodiment includes an image forming apparatus 10, a laminating apparatus 20, and a post-processing apparatus 30.

The laminating apparatus 20 laminates, as necessary, a sheet (flat cut sheet) on which an image has been formed by the image forming apparatus 10.

The post-processing apparatus 30 performs predetermined post-processing on the sheet conveyed from the laminating apparatus 20 as necessary.

(1-1. Configuration of Image Forming Apparatus)

As shown in FIGS. 1 and 2, the image forming apparatus 10 includes a controller 11 (hardware processor), an image reading section 12, an image forming section 13, a storage section 14, an operation panel 15 (display part 151 and operation part 152), and a communication section 16.

The controller 11 includes a central processing unit (CPU), a random access memory (RAM), a read only memory (ROM), and the like. The CPU reads various processing programs stored in the ROM and deploys the programs in the RAM in response to an operation signal input from the operation part 152 or an instruction signal received by the communication section 16. The CPU integrally controls the operation of the image forming apparatus in coordination with various programs deployed in the RAM.

The image reading section 12 scans and exposes the image of a document placed on a document table or an auto document feeder (ADF) (not shown) by an optical system of a scanning exposure device. The image reading section 12 reads the reflected light with a line image sensor and thus obtains an image signal. The image reading section 12 performs processing such as analog-to-digital (A/D) conversion, shading correction, and compression on the image signal, and then inputs the image signal to the controller 11 as image data. The image data input to the controller 11 is not limited to the image data read by the image reading section 12. The image data input to the controller 11 may be, for example, data included in a print job received from an external device (not illustrated) via the communication section 16.

The image forming section 13 forms the image composed of four colors of C, M, Y, and K on a sheet according to pixel values of the four colors in each pixel of an original image subjected to image processing by an electrophotographic method.

As shown in FIG. 1, the image forming section 13 includes four writing units 131, an intermediate transfer belt 132, a secondary transfer roller 133, and a fixing section 134.

Four writing units 131 are arranged in series (tandem) along the belt surface of the intermediate transfer belt 132, and form images of the respective colors of C, M, Y, and K. The writing sections 131 have the same configuration except that they form images in different colors. Each of the writing sections 131 includes an optical scanning section 131a, a photoreceptor 131b, a developing section 131c, a charging section 131d, a cleaning section 131e, and a primary transfer roller 131f.

To form images, the charging section 131d of each writing section 131 charges the photoreceptor 131b. Thereafter, each writing section 131 scans the photoreceptor 131b with light flux emitted from the optical scanning section 131a on the basis of the original image, and forms an electrostatic latent image. The developing section 131c supplies a coloring material such as toner to develop the image and form the image on the photoreceptor 131b.

The primary transfer rollers 131f sequentially transfer images formed on the photoreceptors 131b of the four writing sections 131 to the intermediate transfer belt 132 so that the images overlap (primary transfer). Thus, the writing section 131 forms the image of each color on the intermediate transfer belt 132. The intermediate transfer belt 132 is an image bearing member that is wound around a plurality of rollers to rotate. After the primary transfer, the cleaning section 131e removes the coloring material remaining on the photoreceptor 131b.

The image forming section 13 feeds a sheet from a sheet feed tray T1 in accordance with the timing at which the image on the rotating intermediate transfer belt 132 reaches the position of the secondary transfer roller 133. In the present embodiment, the sheet is a flat cut sheet. One of a pair of the secondary transfer rollers 133 comes in pressing contact with the intermediate transfer belt 132, and the other is one roller among a plurality of rollers around which the intermediate transfer belt 132 is wound. The image forming section 13 transfers (secondarily transfers) the image from the intermediate transfer belt 132 onto the sheet by pressure contact of the secondary transfer roller 133. Thereafter, the image forming section 13 conveys the sheet to the fixing section 134 to perform a fixing process, and conveys the sheet to the laminating apparatus 20. The fixing process is a process of fixing the image on the sheet by heating and pressing the sheet with the fixing roller 134a. In a case in which images are to be formed on both sides of a sheet, the image forming section 13 conveys the sheet to a reversing path 135 to reverse the side of the sheet, and then feeds the sheet again to the position of the secondary transfer roller 133.

The storage section 14 is a non-volatile storage section comprising a hard disk drive (HDD), a solid state drive (SSD), and the like. The storage section 14 stores various programs, various setting data, and the like in a readable and writable manner from the controller 11.

The operation panel 15 includes a display part 151 that displays various kinds of information to a user, and an operation part 152 that receives an operation input from the user.

The display part 151 includes a color liquid crystal display or the like. The display part 151 displays an operation screen and the like in accordance with a display control signal input from the controller 11. The operation screen includes various setting screens, various buttons, an operation status of each function, and the like.

The operation part 152 includes a touch panel provided on the screen of the display part 151 and various hard keys arranged around the screen of the display part 151. When a button displayed on the screen is pressed with a finger, a touch pen, or the like, the operation part 152 detects the XY coordinates of the pressed force point as a voltage value. The operation part 152 outputs an operation signal associated with the detected position to the controller 11. The touch panel is not limited to a pressure-sensitive type and may be, for example, an electrostatic type, an optical type, or the like.

When a hard key is pressed, the operation part 152 outputs an operation signal associated with the pressed key to the controller 11. The user can operate the operation part 152 to perform settings related to image formation such as image quality setting, magnification setting, application setting, output setting, and sheet setting, a sheet conveyance instruction, a stop operation of the apparatus, and the like.

The communication section 16 is an interface that connects the image forming apparatus 10 to a communication network. The communication section 16 includes a communication integrated circuit (IC) and a communication connector. The communication section 16 transmits and receives various kinds of information to and from an external device connected to a communication network using a predetermined communication protocol under the control of the controller 11. The communication section 16 can also input and output various kinds of information via a universal serial bus (USB).

(1-2. Configuration of Laminating Apparatus)

The laminating apparatus 20 (laminator) includes a controller 21, a storage section 22, a communication section 23, an overlapping section 24, a mounting section 25, a laminate processing section 26, a cutting section 27, and a conveying section 28.

The controller 21 includes a CPU, a RAM, a ROM, and the like. The CPU reads various processing programs stored in the ROM and deploys the programs in the RAM in response to an instruction signal received by the communication section 23. The CPU integrally controls the operation of the laminating apparatus 20 in coordination with various programs deployed in the RAM.

The storage section 22 is a non-volatile storage section configured by an HDD, an SSD, or the like, and stores various programs, various setting data, and the like so as to be readable and writable from the controller 21.

The communication section 23 is an interface that connects the laminating apparatus 20 to a communication network. The communication section 23 includes a communication IC and a communication connector. The communication section 23 transmits and receives various kinds of information to and from an external apparatus connected to the communication network using a predetermined communication protocol under the control of the controller 21. The communication section 23 can also input and output various kinds of information via a USB.

As illustrated in FIG. 1, the overlapping section 24 is disposed toward the upstream side of the sheet conveying path than the laminate processing section 26.

Figure 11A:
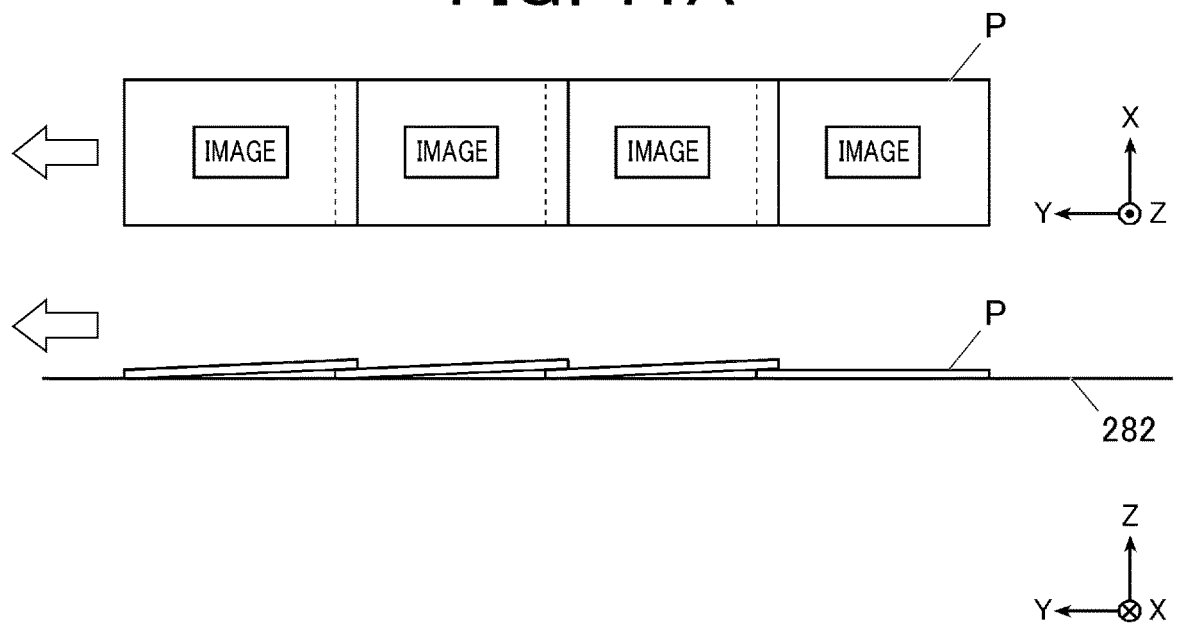
FIG. 11A is a diagram showing an example in which sheets in which a rear end portion of a preceding sheet is overlapped on an upper portion of a front end portion of a following sheet are conveyed in a continuous belt shape.

As shown in FIG. 11A, the overlapping section 24 overlaps the rear end portion of the preceding sheet on the upper portion of the front end portion of the following sheet by a predetermined overlapping amount, and conveys the sheets in a continuous belt shape. A method of overlapping the sheets is, for example, a method of forming an overlapped portion by suctioning a preceding sheet toward an upper surface by suction and inserting a subsequent sheet under the preceding sheet, but the method is not limited to this.

The mounting section 25 is configured so that a film roll 261 of the film F can be attached thereto.

A configuration may be adopted in which any one type of film roll 261 is mounted on the mounting section or a configuration may be adopted in which two or more types of film rolls 261 are simultaneously mounted on the mounting section 25.

The laminate processing section 26 performs laminating in which the film F is continuously attached to the sheet overlapped by the overlapping section 24. That is, the laminate processing section 26 executes a laminate processing in which a plurality of sheets (flat cut sheets) continuously conveyed are collectively laminated with a long film F (laminate film).

The laminate processing section 26 includes a film roll 261, a film conveying path 262, a bonding section 263, a fixing section 264, and the like.

The film roll 261 is a roll of a long film F including a transparent resin film layer and an adhesive layer.

The film conveying path 262 conveys the film F from the film roll 261 to a nip part N1 of the bonding section 263.

A case of a configuration in which two or more types of film rolls 261 are simultaneously mounted on the mounting section 25 will be described. In this case, it is possible to move the film conveying path 262 such that the film F of the film roll 261 selected by the instruction signal of the controller 11 is conveyed to the nip part N1 of the bonding section 263.

As illustrated in FIG. 1, the bonding section 263 includes two rollers. The bonding section 263 sandwiches the sheet and the film F in the nip part N1 formed by the two rollers, so that the adhesive layer of the film F adheres to a front surface of the sheet. Thus, the bonding section 263 laminates the sheet and the film F.

The fixing section 264 includes a heating roller 264a and a pressure roller 264b.

The heating roller 264a includes a halogen heater and the like.

The pressure roller 264b is pressed against the heating roller 264a by being urged upward by an urging member (not illustrated) such as a spring. The heating roller 264a and the pressure roller 264b form a nip part N2 of surface contact.

The heating roller 264a and the pressure roller 264b fuse the adhesive layer of the film F in the nip part N2, and make the fused adhesive layer adhere to the front surface of the sheet, so as to be bonded by heat pressure bonding.

The cutting section 27 inserts a cutting blade between the sheets overlapped by the overlapping section 24 within a predetermined length from the rear end of the preceding sheet to cut only the film F and separate the sheets from each other. As a method of cutting the film F, a known method can be used in which, for example, cutting is performed in synchronization with the advancement of the sheet by the cutting blade attached to a cutter unit installed diagonally to the conveying direction. The known method is, for example, a method described in Japanese Unexamined Patent Publication No. S61-35933.

That is, the cutting section 27 executes a cutting process in which a long film F (laminate film) after laminate processing is cut for each sheet (flat cut sheet) to obtain laminated flat cut sheets.

Figure 11B:
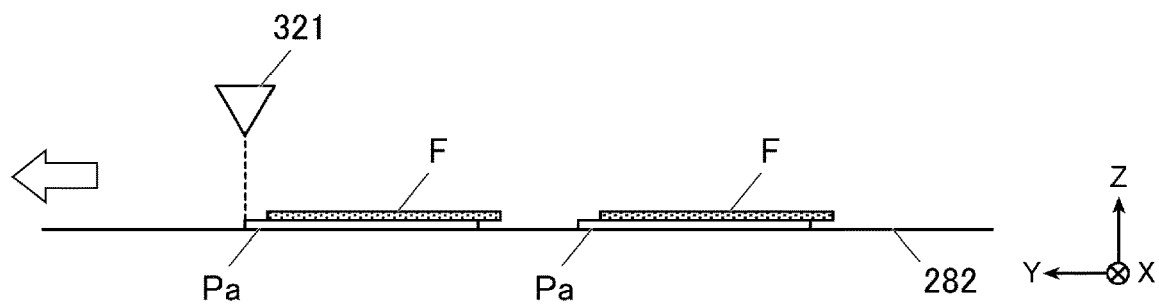
FIG. 11B is an example of a laminated flat cut sheet when the rear end portion of the preceding sheet is overlapped on the upper portion of the front end portion of the following sheet.

In the overlapping section 24 of the present embodiment, the rear end portion of the preceding sheet P is overlapped with the upper portion of the front end portion of the following sheet P by a predetermined overlapping amount as shown in FIG. 11A. Therefore, as illustrated in FIG. 11B, the conveying direction leading end side of the laminated flat cut sheet Pa is in a state where the laminated flat cut sheet Pa protrudes from the leading end of the film F. A conveying direction rear end side of the laminated flat cut sheet Pa is in a state in which the film F protrudes from the rear end of the laminated flat cut sheet Pa.

The conveying section 28 includes a through-pass path 281, a laminate processing path 282, and a plurality of rollers.

Under the control of the controller 21, when the sheet conveyed from the image forming apparatus 10 is not to be laminated, the conveying section 28 conveys the sheet to the post-processing apparatus 30 by a through-pass path 281.

A description will be given of a case where the conveying section 28 performs laminate processing on a sheet conveyed from the image forming apparatus 10 under the control of the controller 21. In this case, the conveying section 28 conveys the sheet to the overlapping section 24, the laminate processing section 26, and the cutting section 27 in this order by the laminate processing path 282, and then conveys the sheet on which the laminate processing is performed to the post-processing apparatus 30.

(1-3. Configuration of Post-Processing Apparatus)

In the example shown in FIG. 1, the laminator system 1 includes post-processing apparatuses 30A and 30B that execute different types of post-processing as the post-processing apparatus 30. However, the number of post-processing apparatuses 30 included in the laminator system 1 is not limited thereto.

The post-processing apparatus 30 includes a controller 31, a post-processing section 32, and a conveying section 33.

The controller 31 includes a CPU, a RAM, a ROM, and the like. The CPU reads various processing programs stored in the ROM and deploys the programs to the RAM. The CPU integrally controls the operation of the post-processing apparatus 30 in coordination with various programs deployed in the RAM.

The post-processing section 32 includes a detecting section 321 that detects a reference position in the conveying direction of the laminated flat cut sheet Pa (sheet P) subjected to post-processing. Under the control of the controller 31, the post-processing unit 32 performs predetermined post-processing on the sheet conveyed from the laminating apparatus 20 with reference to the detected position detected by the detecting section 321. That is, the post-processing section 32 executes a post-processing process in which post-processing is performed on the laminated flat cut sheet.

The post-processing includes, for example, cutting, folding, creasing, perforating, punching, half-cutting, binding, bookbinding, mealing, gluing, stacking, and reversing of leading and rear ends.

The conveying section 33 includes a through-pass path 331, a post-processing path 332, and a plurality of rollers.

Under the control of the controller 31, when no post-processing is performed on the sheet conveyed from the laminating apparatus 20, the conveying section 33 conveys the sheet by the through-pass path 331 and ejects the sheet.

A case where the conveying section 33 performs, under the control of the controller 31, post-processing on a sheet conveyed from the laminating apparatus 20 will be described. In this case, the conveying section 33 conveys the sheet to the post-processing section 32 by a post-processing path 332 and ejects the sheet on which post-processing has been performed.

The post-processing apparatus 30 provided on the most downstream side of the laminator system 1 ejects the sheet to a sheet ejection tray T2.

In the present embodiment, the controller 11 of the image forming apparatus 10 comprehensively controls the entire laminator system 1. However, the controller 21 of the laminating apparatus 20 or the controller 31 of the post-processing apparatus 30 may be configured to integrally control the entire laminator system 1.

<2. Operation of Laminator System>

Figure 3:
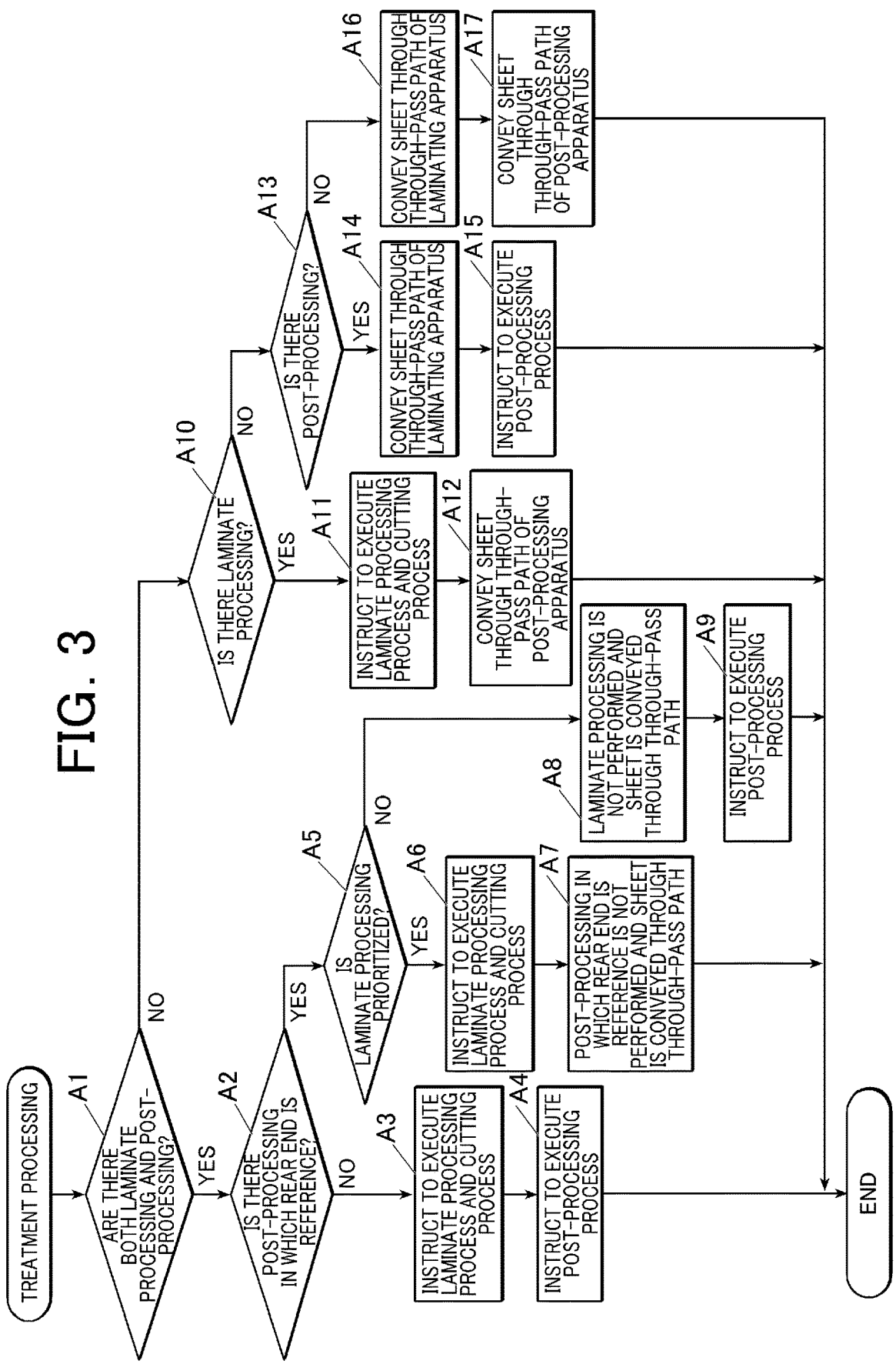
FIG. 3 is a flowchart showing a flow of treatment processing.

Next, the operation of the laminator system 1 in the present embodiment will be described. FIG. 3 is a flowchart illustrating a procedure of treatment processing executed in the laminator system 1.

Upon receipt of a print job, the controller 11 of the image forming apparatus 10 executes the treatment processing.

The print job includes priority information indicating which of the laminate processing and post-processing is to be performed in a case where both of the laminate processing and the post-processing cannot be performed. Which one of them is to be executed depends on which one is to be given priority.

(Treatment Processing)

The controller 11 determines whether or not both the laminate processing and the post-processing process are included in the received print job (step A1).

A case where both the laminate processing and the post-processing are included in the print job (step A1; YES) will be described. In this case, the controller 11 determines whether or not there is post-processing in which the reference in the post-processing is the rear end of the sheet among the post-processing included in the print job (step A2).

A case where all the references of the post-processing included in the print job are the leading end of the sheet (step A2; NO) will be described. In this case, the controller 11 transmits, to the laminating apparatus 20, an instruction signal instructing to execute the laminate processing process and the cutting process (step A3).

The laminating apparatus 20 that has received the instruction signal to execute the laminate processing and the cutting process executes the laminate processing and the cutting process on the sheet on which the image of the print job is formed by the image forming apparatus 10.

Next, the controller 11 transmits an instruction signal for instructing the post-processing apparatus 30 to execute the post-processing process (step A4), and ends the present processing.

The post-processing apparatus 30 that has received the instruction signal for executing the post-processing process detects the leading end of the laminated flat cut sheet Pa conveyed from the laminating apparatus 20 by the detecting section 321 as illustrated in FIG. 11B. Next, the post-processing apparatus 30 executes the post-processing process with reference to the leading end of the laminated flat cut sheet Pa.

In this case, since the post-processing can be performed with reference to the leading end of the laminated flat cut sheet Pa, the post-processing can be performed with high accuracy.

A case where there is post-processing in which the reference in the post-processing is the rear end of the sheet among the post-processing included in the print job (step A2; YES) will be described. In this case, the controller 11 refers to the priority information included in the print job and determines whether to give priority to the laminate processing (step A5).

In a case where the laminate processing is prioritized (step A5; YES), the controller 11 transmits an instruction signal for executing the laminate processing process and the cutting process to the laminating apparatus as in step A3 (step A6).

Next, it is assumed that the controller 11 does not execute post-processing in which the reference in post-processing is the rear end of the sheet. The controller 11 transmits, to the post-processing apparatus 30 in which the reference in the post-processing is the rear end of the sheet, an instruction signal for conveying and ejecting the sheet through the through-pass path 331 (step A7), and ends the present processing. That is, a plurality of types of post-processing can be selected, and in a case where the laminate processing is executed, the controller 11 makes a specific post-processing among the plurality of types of post-processing unselectable.

The post-processing apparatus 30 that has received the post-processing non-execution instruction signal does not execute the post-processing process. The post-processing apparatus 30 conveys the laminated flat cut sheet Pa conveyed from the laminating apparatus 20 through the through-pass path 331 and ejects the laminated flat cut sheet Pa.

In this case, it is possible to prevent the post-processing from being performed with reference to the end portion where the film F protrudes from the rear end of the laminated flat cut sheet Pa. Therefore, it is possible to prevent the accuracy of post-processing from becoming worse and to prevent a conveyance failure from occurring due to the film F being caught in the post-processing section 32.

In this case, if the print job includes post-processing in which the reference in the post-processing is the leading end of the sheet, the post-processing may be executed.

A case where the laminate processing is not prioritized (step A5; NO), that is, a case where the post-processing is prioritized will be described. In this case, the controller 11 determines that the laminate processing is not to be performed, and transmits an instruction signal to the laminating apparatus 20 to convey and eject the sheet through the through-pass path 281 (step A8).

The laminating apparatus 20 that has received the instruction signal not to perform lamination does not perform the laminate processing process and the cutting process. The laminating apparatus 20 conveys the sheet conveyed from the image forming apparatus 10 through the through-pass path 281 and ejects the sheet.

Next, the controller 11 transmits an instruction signal for instructing execution of the post-processing process to the post-processing apparatus 30 in which the reference in the post-processing is the rear end of the sheet (step A9), and ends the present processing. That is, a plurality of types of post-processing can be selected, and in a case where specific post-processing is executed among the plurality of types of post-processing, the controller 11 makes the laminate processing unselectable.

The post-processing apparatus 30 that has received the instruction signal for executing the post-processing process detects the rear end of the sheet conveyed from the laminating apparatus 20 by the detecting section 321. The post-processing apparatus 30 executes a post-processing process with reference to the rear end of the sheet.

In this case, since the post-processing can be performed with reference to the rear end of the sheet, the post-processing can be accurately performed.

Described below is a case in which the post-processing process is executed and the print job includes post-processing in which the reference for post-processing is the leading end of the sheet. In this case, the controller 11 causes the post-processing apparatus 30 in which the reference in the post-processing is the leading end of the sheet to execute the post-processing process.

A case where at least one of the laminate processing and the post-processing is not included in the print job (step A1; NO) will be described. In this case, the controller 11 determines whether or not the print job includes laminate processing (step A10).

A case where the printing job includes the laminate processing and does not include the post-processing (step A10; YES) will be described. In this case, the controller 11 transmits an instruction signal for executing the laminate processing process and the cutting process to the laminating apparatus 20 as in step A3 (step A11).

Next, the controller 11 transmits, to the post-processing apparatus 30, an instruction signal for conveying, via the through-pass path 331, the laminated flat cut sheet Pa conveyed from the laminating apparatus 20 and ejecting the sheet (step A12). The controller 11 ends the present processing.

If the print job does not include laminate processing (step A10; NO), the controller 11 determines whether or not the print job includes post-processing (step A13).

A case where the print job does not include laminate processing but includes post-processing (step A13; YES) will be described. In this case, the controller 11 transmits, to the laminating apparatus 20, an instruction signal for conveying the sheet conveyed from the image forming apparatus 10 through the through-pass path 281 and ejecting the sheet (step A14).

Next, the controller 11 transmits an instruction signal for instructing the post-processing apparatus 30 to execute the post-processing process (step A15), and ends the present processing.

In this case, since the post-processing can be performed with reference to the leading end or the rear end of the sheet, the post-processing can be accurately performed.

A case where both the laminate processing and the post-processing are not included in the print job (step A13; NO) will be described. In this case, the controller 11 transmits to the laminating apparatus 20 the instruction signal for conveying the sheet conveyed from the image forming apparatus 10 through the through-pass path 281 and ejecting the sheet (step A16).

Next, the controller 11 transmits, to the post-processing apparatus 30, an instruction signal for conveying the sheet conveyed from the laminating apparatus 20 through the through-pass path 331 and ejecting the sheet (step A17). The controller 11 ends the present processing.

In the above-described treatment processing, the end portion of the laminated flat cut sheet Pa as a reference in the post-processing is an end portion on a side where the film F (laminate film) does not protrude from the end portion of each laminated flat cut sheet Pa.

Modification Example 1

Next, a modification example 1 of the above embodiment will be described. Hereinafter, differences from the above embodiment will be mainly described.

Figure 12A:
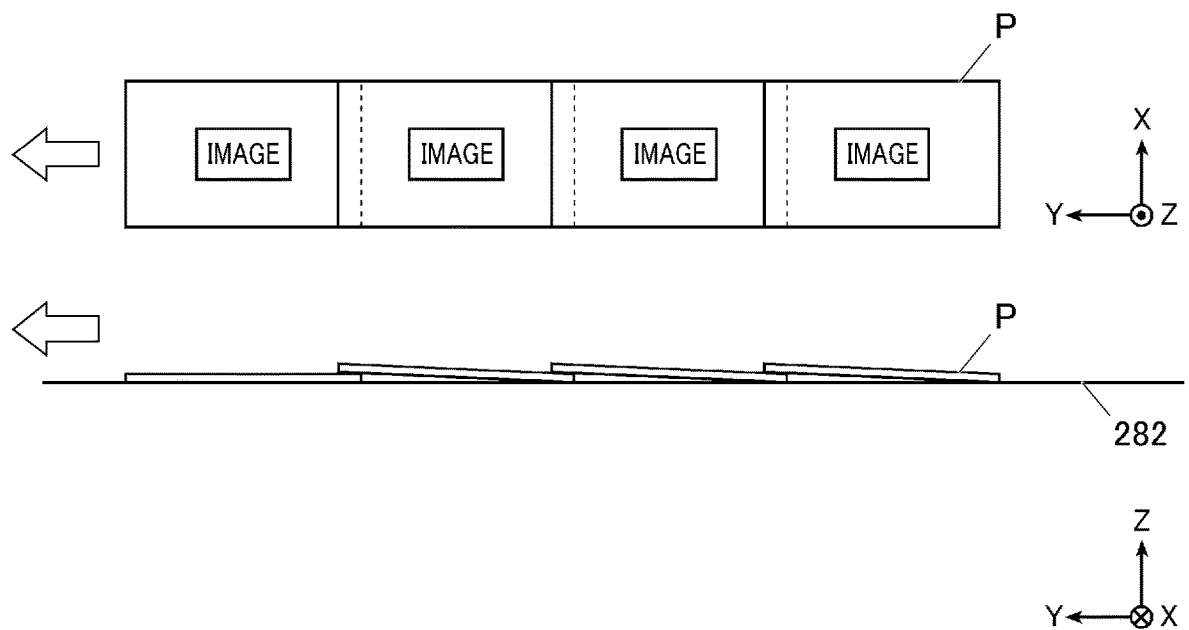
FIG. 12A is a diagram showing an example in which sheets in which the rear end portion of the preceding sheet is overlapped on the lower portion of the front end portion of the subsequent sheet are conveyed in a continuous belt shape.

As shown in FIG. 12A, the overlapping section 24 of the present modification example overlaps the rear end portion of the preceding sheet with the lower portion of the front end portion of the following sheet by a predetermined overlapping amount, and conveys the sheets in a continuous belt shape.

The cutting section 27 inserts the cutting blade between the sheets overlapped by the overlapping section 24 within a predetermined length from the leading end of the subsequent sheet to cut only the film F, and separates the sheets from each other.

Figure 12B:
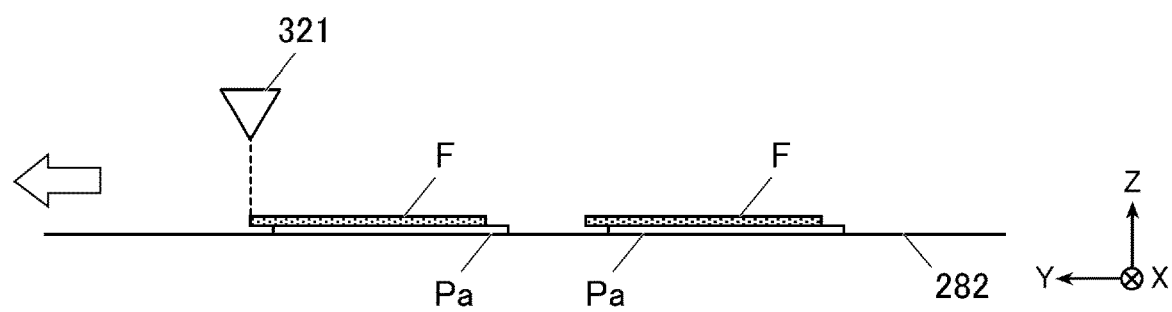
FIG. 12B is a view showing an example of the laminated flat cut sheet in the case where the rear end portion of the preceding sheet is overlapped on the lower portion of the front end portion of the following sheet.

Therefore, as illustrated in FIG. 12B, the conveying direction leading end side of the laminated flat cut sheet Pa is in a state where the film F protrudes from the leading end of the laminated flat cut sheet Pa. The conveying direction rear end side of the laminated flat cut sheet Pa is in a state where the laminated flat cut sheet Pa protrudes from the rear end of the film F.

Figure 4:
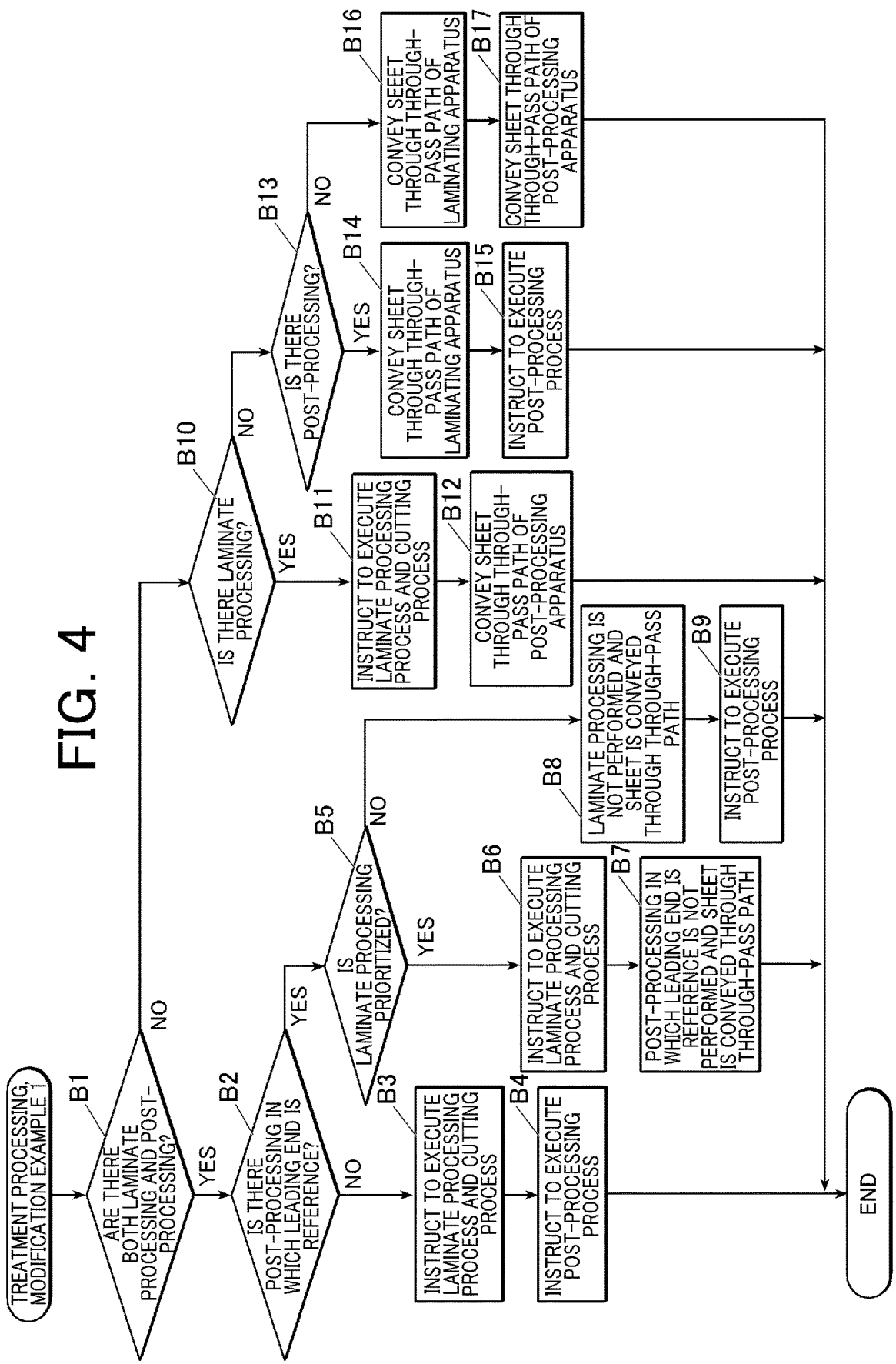
FIG. 4 is a flowchart showing a flow of the treatment processing in modification example 1.

FIG. 4 is a flowchart showing a procedure of the treatment processing in the present modification example.

Treatment Processing in Modification Example 1

The controller 11 executes step B1 similar to step A1 of the above-described embodiment.

A case where both the laminate processing and the post-processing are included in the print job (step B1; YES) will be described. In this case, the controller 11 determines whether or not there is post-processing in which the reference in the post-processing is the leading end of the sheet among the post-processing included in the print job (step B2).

A case where all the references of the post-processing included in the print job are the rear end portion of the sheet (step B2; NO) will be described. In this case, the controller 11 performs steps B3 and B4 similar to steps A3 and A4 of the above-described embodiment.

In step B4, the post-processing apparatus 30 that has received the instruction signal to execute the post-processing process detects the rear end of the laminated flat cut sheet Pa conveyed from the laminating apparatus 20 by the detecting section 321. The post-processing apparatus 30 performs a post-processing process with reference to the rear end of the laminated flat cut sheet Pa.

In this case, since the post-processing can be executed with the rear end of the laminated flat cut sheet Pa as the reference, the post-processing can be accurately performed.

A case where the reference in the post-processing is the leading end of the sheet among the post-processing included in the print job (step B2; YES) will be described. In this case, the controller 11 performs steps B5 and B6 similar to steps A5 and A6 of the above embodiment.

Next, it is assumed that the controller 11 does not execute post-processing in which the reference in post-processing is the leading end of the sheet. The controller 11 transmits, to the post-processing apparatus 30 in which the reference in the post-processing is the leading end of the sheet, an instruction signal for conveying and ejecting the sheet through the through-pass path 331 (step B7). The controller 11 ends the present processing.

The post-processing apparatus 30 that has received the instruction signal of non-execution of post-processing does not execute the post-processing process. The post-processing apparatus 30 conveys the laminated flat cut sheet Pa conveyed from the laminating apparatus 20 through the through-pass path 331 and ejects the laminated flat cut sheet Pa.

In this case, it is possible to prevent the post-processing from being performed with reference to the end portion in which the film F protrudes from the leading end of the laminated flat cut sheet Pa. Therefore, it is possible to prevent the accuracy of post-processing from becoming worse and to prevent a conveyance failure from occurring due to the film F being caught in the post-processing section 32.

In this case, when the print job includes post-processing in which the reference in the post-processing is the rear end of the sheet, the post-processing process may be executed.

In a case where the laminating process is not prioritized (step A5; NO), that is, in a case where the post-processing is prioritized, the controller 11 performs step B8 similar to step A8 of the above-described embodiment.

Next, the controller 11 transmits an instruction signal instructing the execution of the post-processing process to the post-processing apparatus 30 in which the reference in the post-processing is the leading end of the sheet (step B9), and ends the present processing.

After receiving the instruction signal for executing the post-processing process, the post-processing apparatus 30 detects the leading end of the sheet conveyed from the laminating apparatus 20 by the detecting section 321. The post-processing apparatus 30 executes the post-processing process with reference to the leading end of the sheet.

In this case, since the post-processing can be executed with reference to the leading end of the sheet, the post-processing can be executed with high accuracy.

A case where the post-processing is executed and the print job includes post-processing in which the reference for post-processing is the rear end of the sheet will be described. In this case, the controller 11 causes the post-processing apparatus 30 in which the reference of the post-processing is the rear end of the sheet to execute the post-processing process.

The controller 11 performs steps B10 to B17 similar to steps A10 to A17 of the above embodiment.

Modification Example 2

Next, a modification example 2 of the above embodiment will be described. Hereinafter, differences from the above embodiment will be mainly described.

As in modification example 1, the overlapping section 24 according to the present modification example overlaps the rear end of the preceding sheet with the lower portion of the leading end of the following sheet by the predetermined amount, and conveys the sheets in the continuous belt shape. Therefore, as illustrated in FIG. 12B, the conveying direction leading end side of the laminated flat cut sheet Pa is in a state where the film F protrudes from the leading end of the laminated flat cut sheet Pa. The conveying direction rear end side of the laminated flat cut sheet Pa is in a state where the laminated flat cut sheet Pa protrudes from the rear end of the film F.

Figure 5:
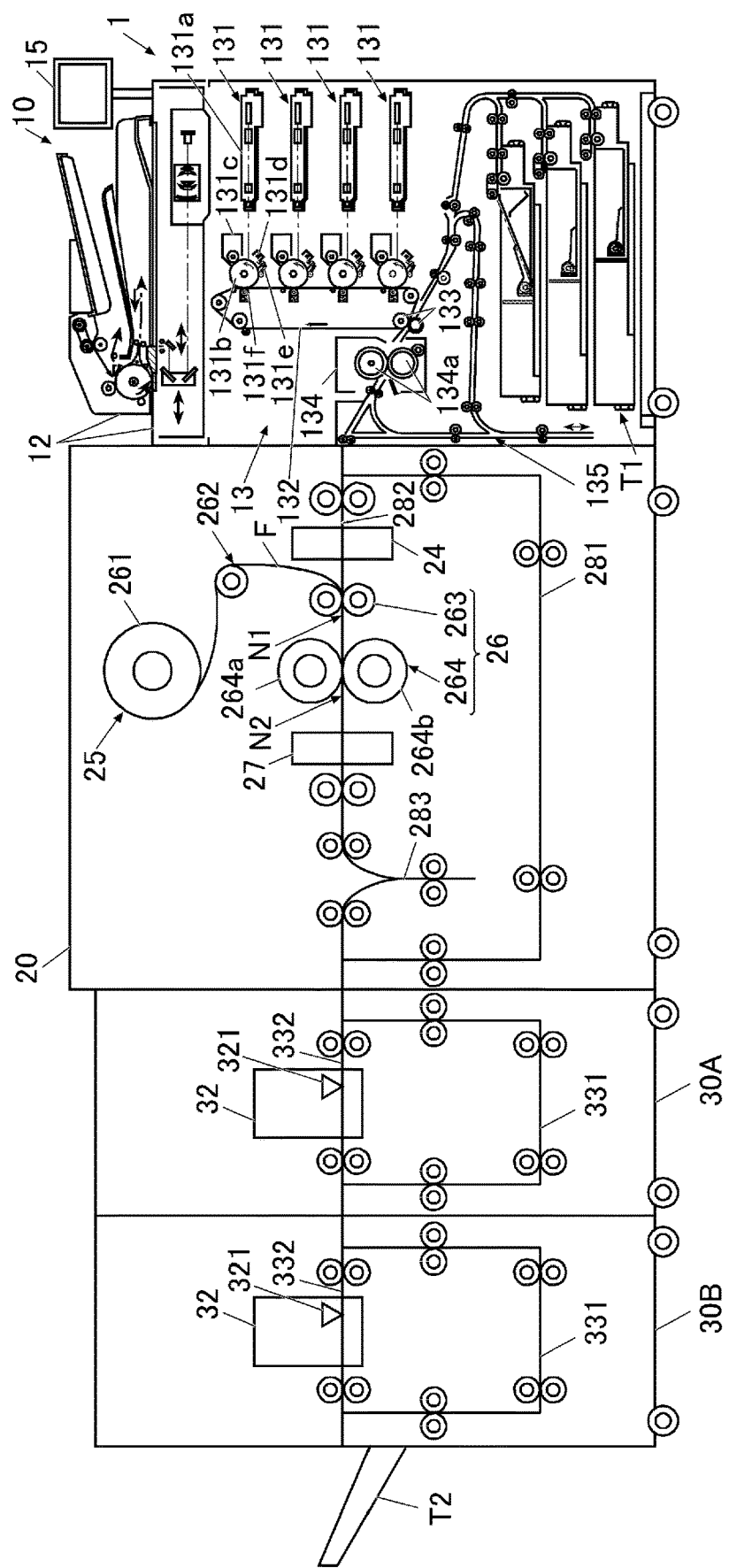
FIG. 5 is a front view showing a schematic configuration of a laminator system in modification example 2.

As illustrated in FIG. 5, the conveying section 28 of the laminating apparatus 20 of the present modification example includes a reversing section 283.

The reversing section 283 includes a reversing path and a reversing roller. The reversing section 283 switches back the laminated flat cut sheet Pa conveyed from the cutting section 27 by a reversing roller or the like to turn over the front and back of the laminated flat cut sheet Pa, and then conveys the laminated flat cut sheet Pa to the post-processing apparatus 30.

Since the front and back of the laminated flat cut sheet Pa are reversed by the reversing section 283, the conveying direction leading end side of the laminated flat cut sheet Pa is brought into a state in which the laminated flat cut sheet Pa protrudes from the leading end of the film F. The conveying direction rear end side of the laminated flat cut sheet Pa is in a state where the film F protrudes from the rear end of the laminated flat cut sheet Pa.

Instead of the laminating apparatus 20 including the reversing section 283, the post-processing apparatus may include the reversing section 283. Another device provided between the laminating apparatus 20 and the post-processing apparatus 30 may include the reversing section 283.

In the present modification example, the controller 11 of the image forming apparatus 10 executes the treatment processing similar to that of the above-described embodiment.

Modification Example 3

Next, a modification example 3 of the embodiment will be described. Hereinafter, differences from the above embodiment will be mainly described.

The overlapping section 24 of the present modification example may be configured to overlap the rear end portion of the preceding sheet on the upper portion of the front end portion of the subsequent sheet as in the above-described embodiment. The overlapping section 24 according to the present modification may be configured to overlap the rear end portion of the preceding sheet with the lower portion of the front end portion of the following sheet, as in the modification example 1.

Figure 6:
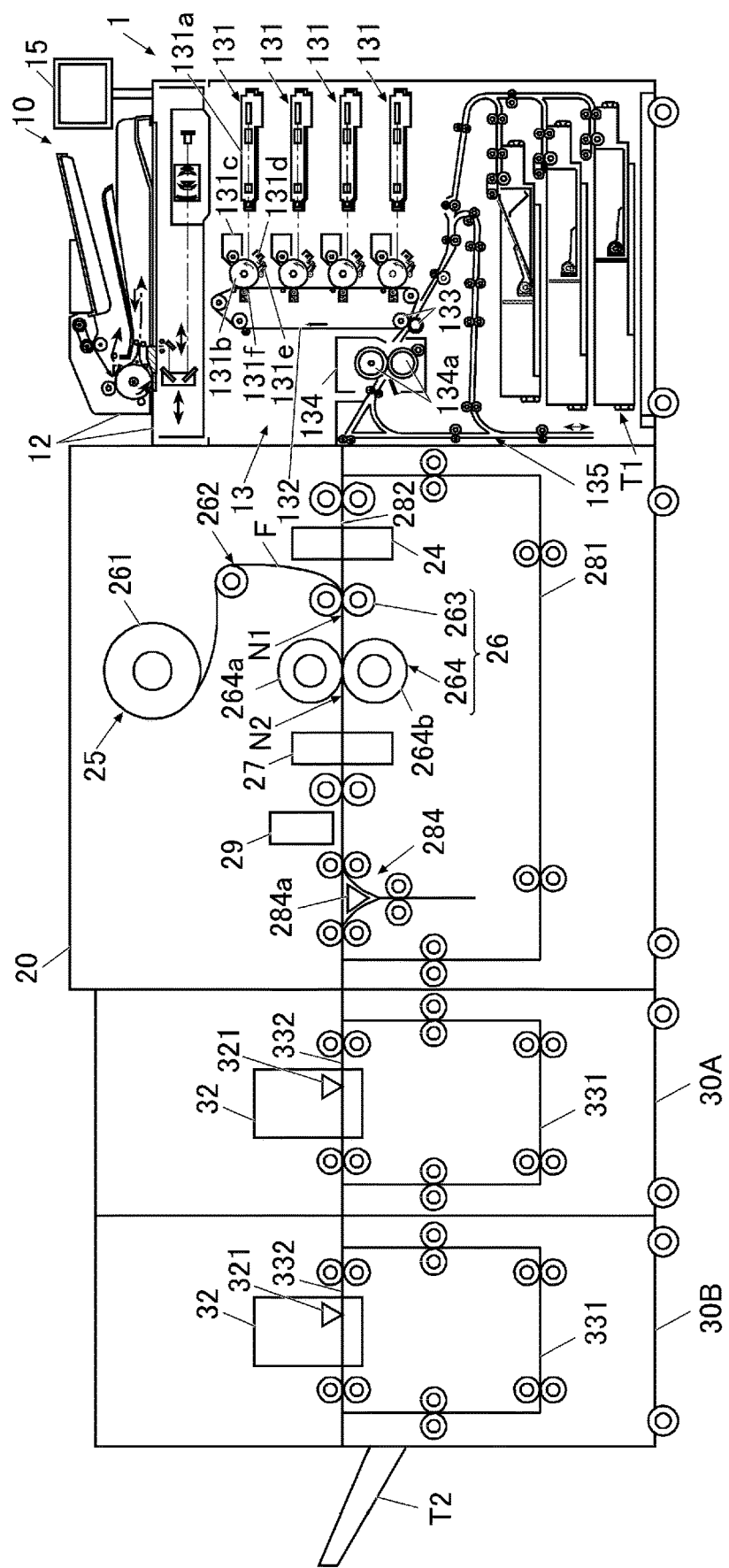
FIG. 6 is a front view showing a schematic configuration of a laminator system in modification example 3.

As illustrated in FIG. 6, the conveying section 28 of the laminating apparatus 20 of the present modification example includes a reversing section 284.

The reversing section 284 includes a reversing path, a conveying path switching section 284*a*, and a reversing roller.

The reversing section 284 conveys the laminated flat cut sheet Pa conveyed from the cutting section 27 to the post-processing apparatus 30 without reversing the front and back of the laminated flat cut sheet Pa in accordance with the switching operation of the conveying path switching section 284*a* under the control of the controller 11. Under the control of the controller 11, the reversing section 284 switches back the laminated flat cut sheet Pa by a reversing roller or the like, reverses the front and back of the laminated flat cut sheet Pa, and then conveys the laminated flat cut sheet Pa to the post-processing apparatus 30.

As illustrated in FIG. 6, the laminating apparatus 20 of the present modification example includes a reading section 29.

The reading section 29 includes a line sensor such as a charge-coupled device (CCD) sensor.

The reading section 29 reads the laminated flat cut sheet Pa conveyed by the laminate processing path 282 and outputs read data to the controller 11 of the image forming apparatus 10.

Instead of the laminating apparatus 20 including the reversing section 284 and the reading section 29, the post-processing apparatus 30 may include the reversing section 284 and the reading section 29. Another device provided between the laminating apparatus 20 and the post-processing apparatus 30 may include the reversing section 284 and the reading section 29. Different apparatuses may include the reversing section 284 and the reading section 29.

(Reversing Processing)

Figure 7:
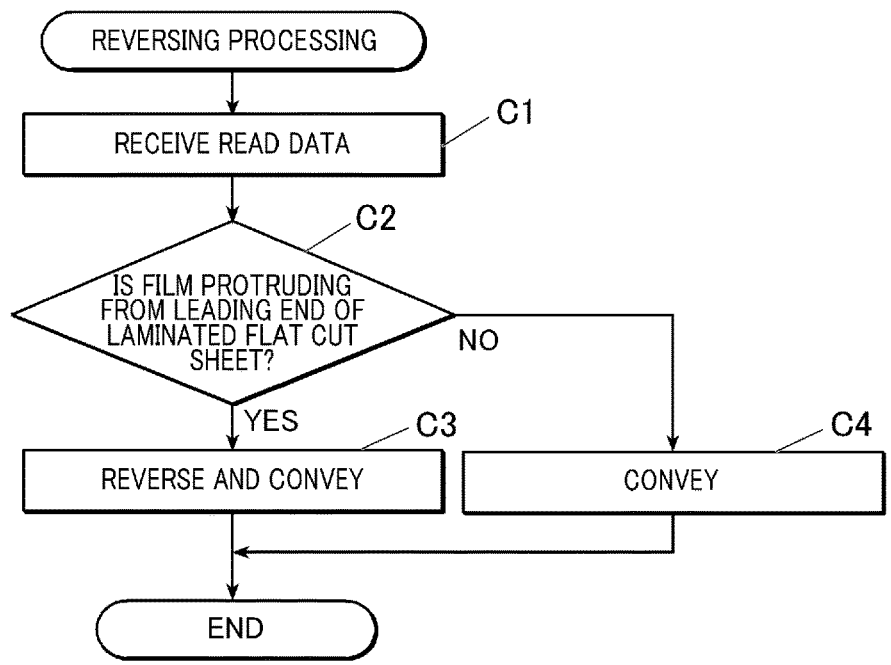
FIG. 7 is a flowchart showing a flow of reversing processing in modification example 3.

In the present modification example, the controller 11 of the image forming apparatus 10 executes the reversing process illustrated in FIG. 7.

The controller 11 receives the read data read by the reading section 29 (step C1).

Next, the controller 11 determines whether or not the conveying direction leading end side of the laminated flat cut sheet Pa conveyed through the laminate processing path 282 is in a state where the film F protrudes from the leading end of the laminated flat cut sheet Pa (step C2). In step C2, the controller 11 makes a determination based on the read data received in step C1.

The case where the conveying direction leading end side of the laminated flat cut sheet Pa is in a state where the film F protrudes from the leading end of the laminated flat cut sheet Pa (step C2; YES) will be described. In this case, the controller 11 controls the reversing section 284 to reverse the front and back of the laminated flat cut sheet Pa and then convey the laminated flat cut sheet Pa to the post-processing apparatus 30 (step C3), and ends the present processing.

A case where the conveying direction leading end side of the laminated flat cut sheet Pa is in a state in which the film F does not protrude from the leading end of the laminated flat cut sheet Pa (step C2; NO) will be described. In this case, the controller 11 conveys the laminated flat cut sheet Pa to the post-processing apparatus 30 without reversing the front and back of the laminated flat cut sheet Pa (step C4), and ends the process. The state in which the conveying direction leading end side of the laminated flat cut sheet Pa is such that the film F does not protrude from the leading end of the laminated flat cut sheet Pa includes a state in which the laminated flat cut sheet Pa protrudes from the leading end of the film F. The state in which the conveying direction leading end side of the laminated flat cut sheet Pa is such that the film F does not protrude from the leading end of the laminated flat cut sheet Pa includes a state in which the leading end of the film F and the leading end of the laminated flat cut sheet Pa are aligned with each other in the conveying direction.

The controller 11 executes the treatment processing similar to that of the above-described embodiment.

(Cutting Position Adjustment Processing)

Figure 8:
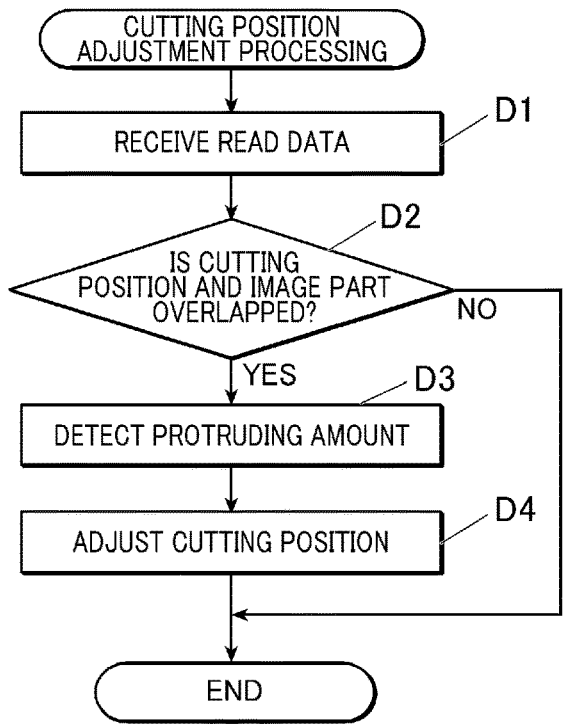
FIG. 8 is a flowchart showing a flow of cutting position adjustment processing in modification example 3.

In the present modification example, the controller 11 of the image forming apparatus 10 executes cutting position adjustment processing illustrated in FIG. 8.

The controller 11 receives the read data read by the reading section 29 (step D1).

Figure 9:
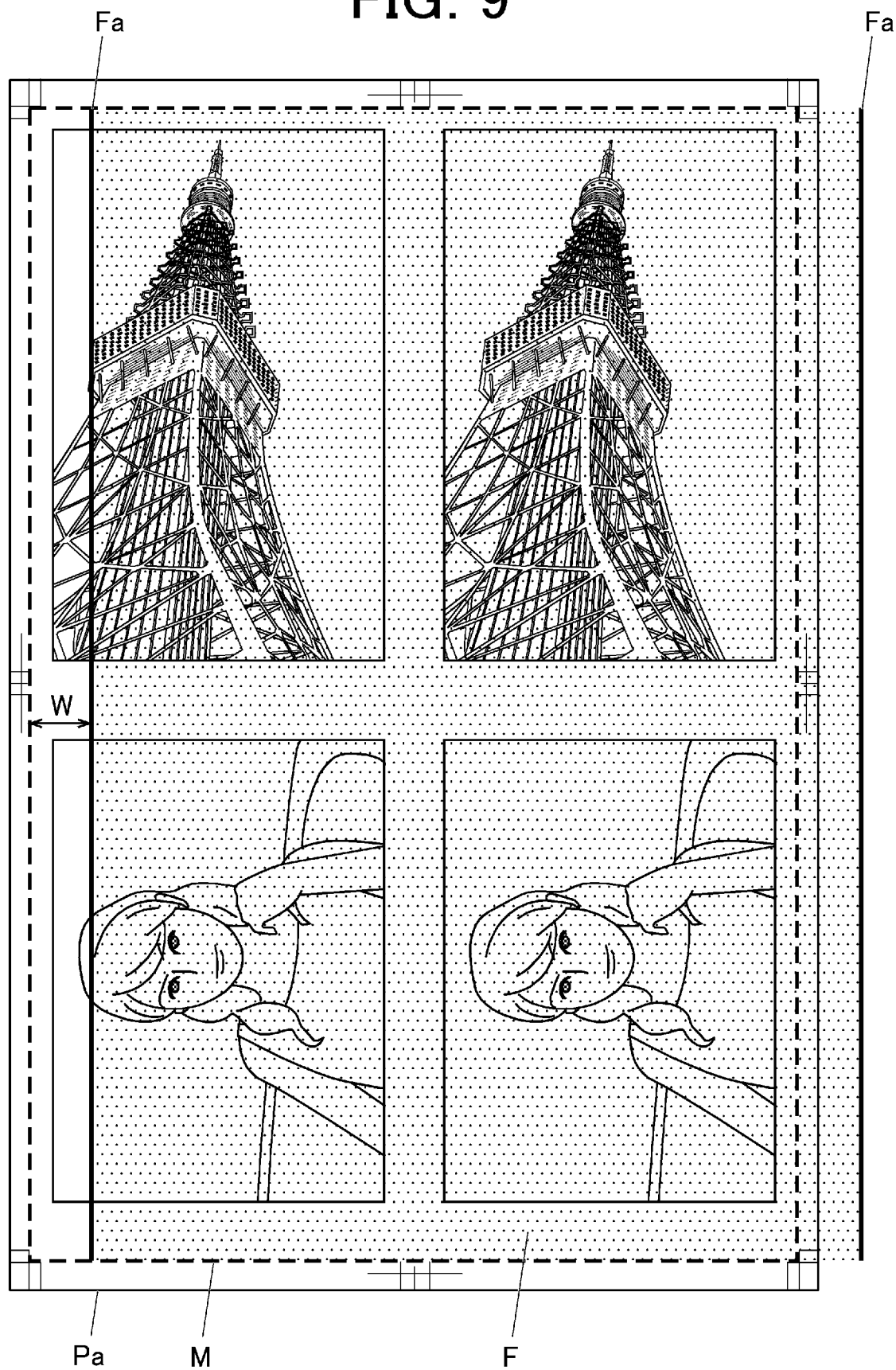
FIG. 9 shows an example of a laminated flat cut sheet according to modification example 3.

Next, as illustrated in FIG. 9, the controller 11 determines whether or not an image part M formed on the laminated flat cut sheet Pa and a cutting position Fa of the film F cut by the cutting section 27 overlap each other (step D2). In step D2, the controller 11 makes a determination based on the read data received in step D1.

A case where the image part M and the cutting position Fa overlap each other (step D2; YES) will be described. In this case, the controller 11 detects a protruding amount W (see FIG. 9) that is an amount by which the image part M protrudes from the cutting position Fa (step D3).

Next, the controller 11 adjusts the cutting position Fa based on the protruding amount W detected in step D3 (step D4) and ends the present processing.

In step D4, the controller 11 notifies the controller 21 of a cutting position adjustment instruction including information on the protruding amount W. The controller 21 controls the overlapping section 24, and can change, based on the protruding amount W, the amount of overlap between the rear end of the preceding sheet and the leading end of the following sheet to a smaller amount so that the image part M and the cutting position Fa do not overlap each other.

In step D4, the controller 11 may control the image forming section 13 and shift the position of the image to be formed on the sheet on the basis of the protruding amount W so that the image part M and the cutting position Fa do not overlap each other.

The present invention is not limited to the above-described embodiments and modification examples, and can be modified without departing from the scope of the invention.

Figure 10:
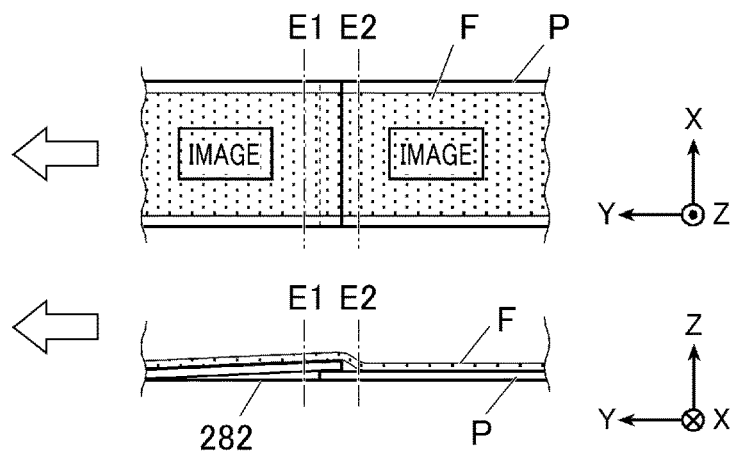
FIG. 10 is a view showing an example of cutting a laminate film and a sheet at positions upstream and downstream in the conveying direction.

For example, the cutting section 27 of the laminating apparatus 20 may cut the overlapped portion where the rear end of the preceding sheet P and the leading end of the following sheet P are overlapped at the next position. To be more specific, as shown in FIG. 10, the cutting section 27 may cut the film F, the rear end of the preceding sheet P, and the leading end of the following sheet P at an upstream position E2 and a downstream position E1 in the conveying direction.

In this case, the conveying direction leading end side of the laminated flat cut sheet Pa is in a state where the leading end of the film F and the leading end of the laminated flat cut sheet Pa are aligned with each other in the conveying direction. On the conveying direction rear end side of the laminated flat cut sheet Pa, the rear end of the film F and the rear end of the laminated flat cut sheet Pa coincide with each other in the conveying direction. Therefore, it is possible to appropriately perform the post-processing with reference to the leading end or the rear end of the laminated flat cut sheet Pa. Therefore, the post-processing can be executed with high accuracy.

As described above, the laminator system 1 according to the present embodiment includes the laminate processing section 26 which collectively laminates a plurality of continuously conveyed flat cut sheets (sheet P) with a long laminate film (film F), the cutting section 27 which cuts the laminated long laminate film for each flat cut sheet to obtain the laminated flat cut sheets, and the post-processing section 32 which post-processes the laminated flat cut sheets, and the end portion of the laminated flat cut sheet which is the reference in the post-processing is the end portion on the side where the laminate film does not protrude from the end portion of each laminated flat cut sheet.

Therefore, it is possible to prevent the post-processing from being performed with the end portion in which the film F protruding from the leading end of the laminated flat cut sheet Pa is used as the reference. Therefore, it is possible to prevent the accuracy of the post-processing from deteriorating. That is, post-processing can be more appropriately performed after the laminate processing.

The laminator system 1 according to the present embodiment executes the post-processing process without reversing the orientation of the leading and rear ends of each laminate flat cut sheet with respect to the conveying direction after cutting of the long laminate film by the cutting section 27.

A case where the conveying direction leading end side of the laminated flat cut sheet Pa is in a state where the film F does not protrude from the leading end of the laminated flat cut sheet Pa will be described. In this case, the post-processing in which the reference in the post-processing is the leading end of the sheet can be appropriately executed.

The laminator system 1 according to the present embodiment executes the post-processing process after reversing the orientation of the leading and rear ends of each laminated flat cut sheet with respect to the conveying direction after cutting of the long laminate film by the cutting section 27.

A case where the conveying direction rear end side of the laminated flat cut sheet Pa is in a state where the film F does not protrude from the rear end of the laminated flat cut sheet Pa will be described. In this case, by reversing the sheet, the post-processing in which the reference in the post-processing is the leading end of the sheet can be appropriately executed.

In the laminator system 1 according to the present embodiment, after the cutting of the long laminate film by the cutting section 27, the laminate film does not protrude from the end portion on the leading end side of each laminate flat cut sheet in the conveying direction.

Therefore, it is possible to appropriately execute the post-processing in which the reference in the post-processing is the leading end of the sheet.

In the laminator system 1 according to the present embodiment, the laminate processing section 26 performs laminate processing on continuously conveyed sheets in a state where the rear end of the preceding flat cut sheet and the leading end of the following flat cut sheet overlap each other.

The cutting section 27 cuts the long laminate film, the preceding flat cut sheet, and the following flat cut sheet at a position upstream and a position downstream in the conveying direction with respect to the overlapped portion where the rear end of the preceding flat cut sheet and the leading end of the following flat cut sheet overlap each other.

Therefore, the conveying direction leading end side of the laminated flat cut sheet Pa is in a state where the leading end of the film F and the leading end of the laminated flat cut sheet Pa coincide with each other in the conveying direction. The conveying direction rear end of the laminated flat cut sheet Pa is in a state where the rear end of the film F and the rear end of the laminated flat cut sheet Pa coincide with each other in the conveying direction. Therefore, it is possible to appropriately perform the post-processing with reference to the leading end or the rear end of the laminated flat cut sheet Pa. Therefore, the post-processing can be executed with high accuracy.

In the laminator system 1 according to the present embodiment, the laminate processing section 26 laminates the sheets in the overlapped state where the leading end of the following flat cut sheet is placed under the rear end of the preceding flat cut sheet, and the cutting section 27 cuts the long laminate film within a predetermined length from the rear end of the preceding sheet.

Therefore, in this case, the conveying direction leading end side of the laminated flat cut sheet Pa is in a state where the laminated flat cut sheet Pa protrudes from the leading end of the film F. Therefore, the post-processing in which the reference in the post-processing is the leading end of the sheet can be appropriately executed.

In the laminator system 1 according to the present embodiment, the laminate processing section 26 laminates the sheets in the overlapped state where the leading end of the following flat cut sheet is overlapped on the rear end of the preceding flat cut sheet, and the cutting section 27 cuts the long laminate film within a predetermined length from the leading end of the following flat cut sheet.

Therefore, in this case, the conveying direction rear end side of the laminated flat cut sheet Pa is in a state where the laminated flat cut sheet Pa protrudes from the rear end of the film F. Therefore, the post-processing in which the reference in the post-processing is the rear end of the sheet can be appropriately executed.

In the laminator system 1 according to the present embodiment, when the cutting position of the long laminate film to be cut by the cutting section 27 overlaps the image part on the flat cut sheet, the controller 11 can change the amount of overlap between the rear end of the preceding flat cut sheet and the leading end of the following flat cut sheet to a smaller amount so that the cutting position does not overlap the image part.

Therefore, the laminated flat cut sheet in which the entire surface of the image part is covered with the laminate film can be obtained.

In the laminator system 1 according to the present embodiment, a plurality of types of post-processing can be selected, and in a case where the laminate processing is executed, the controller 11 makes a specific post-processing among the plurality of types of post-processing unselectable.

Therefore, it is possible to prevent the selection of the post-processing based on the end portion where the film F protrudes from the leading end of the laminated flat cut sheet Pa. Therefore, it is possible to prevent the accuracy of the post-processing from deteriorating.

In the laminator system 1 according to the present embodiment, a plurality of types of post-processing can be selected, and in a case where a specific post-processing is executed among the plurality of types of post-processing, the controller 11 makes the laminate processing unselectable.

Therefore, in the post-processing, it is possible to prevent the end portion where the film F protrudes from the leading end of the laminated flat cut sheet Pa from being used as the reference. Therefore, it is possible to prevent the accuracy of the post-processing from deteriorating.

In the laminator system 1 according to the present embodiment, the post-processing includes at least one of cutting, folding, creasing, perforating, punching, half-cutting, binding, bookbinding, mealing, gluing, stacking, and reversing of leading and rear ends.

Therefore, cutting, folding, creasing, perforating, punching, half-cutting, binding, bookbinding, mealing, gluing, stacking, or reversing of the leading and rear ends as post-processing can be executed more appropriately.

The laminator system 1 according to the present embodiment forms the image on the flat cut sheet that has not yet undergone laminate processing.

When the cutting position of the long laminate film to be cut by the cutting section 27 overlaps with the image part on the sheet, the controller 11 can shift the position of the image to be formed on the flat cut sheet so that the cutting position does not overlap with the image part.

Therefore, the laminated flat cut sheet in which the entire surface of the image part is covered with the laminate film can be obtained.

Although specific description has been given above on the basis of the embodiment according to the present invention, the present invention is not limited to the above-described embodiment, and modifications can be made without departing from the spirit and scope of the present invention.

For example, in the above-described embodiment, the laminate processing is performed on the front surface of the sheet, but the present invention is not limited thereto. The laminate processing may be performed not only on the entirety of one surface of the sheet but also on only a part of the one surface, or may be performed not only on one surface but also on both surfaces.

In the above embodiment, the sheet is the flat cut sheet, but may be a continuous sheet.

Although the image forming section 13 forms an image by an electrophotographic method in the embodiment described above, any image forming method may be used including an inkjet method.

The present invention may be applied to a laminator system including the laminating apparatus 20 and the post-processing apparatus 30 that are not connected to the image forming apparatus 10.

The post-processing section 32 may be included in the laminating apparatus 20. The number and type of the post-processing portions 32 are not limited to the examples of the above embodiment.

The laminating method of the above-described embodiment is a hot laminating method of melting and fixing the adhesive layer of the film F by the fixing section 264, but is not limited thereto. The laminating method may be a cold laminating method in which the fixing section 264 does not perform heating, and the film F including an adhesive layer that can be adhered at room temperature by the pressurizing unit is brought into pressure contact with the sheet to perform fixing.

Although the film F has a roll shape in the embodiment described above, the film F may be a cut flat sheet of the laminate film.

Although the optional configuration in which the laminating apparatus 20 is attached separately from the image forming apparatus 10 is adopted in the embodiment, there is no limitation thereto. For example, the laminating apparatus 20 may be built in the image forming apparatus 10.

The treatment processing, the reversing processing, and the cutting position adjustment processing in the above embodiment are performed by the controller 11, but the processing does not have to be performed by the controller 11. The above processing may be executed by the controller 21 of the laminating apparatus 20 or the controller 31 of the post-processing apparatus 30. A controller of an external device communicably connected to the image forming apparatus 10 or the laminating apparatus 20 may execute the processing.

A description will be provided on a case where, in the laminator system 1 of modification example 2 or modification example 3 described above, the conveying direction leading end side of the laminated flat cut sheet Pa is in a state where the film F protrudes from the leading end of the laminated flat cut sheet Pa. In this case, instead of reversing the laminated flat cut sheet Pa, a configuration may be adopted in which, after cutting of the film F, the film F protruded from the leading end of the laminated flat cut sheet Pa is bent so as not to be protruded.

In the laminator systems 1 of modification example 2 and modification example 3, the laminated flat cut sheet Pa may be rotated in a horizontal direction instead of reversing the laminated flat cut sheet Pa. Accordingly, the conveying direction leading end side of the laminated flat cut sheet Pa is in a state where the film F does not protrude from the leading end of the laminated flat cut sheet Pa.

In addition, the detailed configuration of each device configuring the image forming apparatus and the detailed operation of each device can also be appropriately changed without departing from the spirit and scope of the present invention.

Although some embodiments of the present invention have been described, the scope of the present invention is not limited to the above-described embodiments, and includes the scope of the invention described in the claims and its equivalents.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A processing method comprising:
collectively performing laminate processing with a long laminate film on a plurality of continuously conveyed flat cut sheets;
cutting the long laminate film after the laminate processing for each flat cut sheet and obtaining a laminated flat cut sheet; and
performing post-processing on the laminated flat cut sheet,
wherein an end portion of the laminated flat cut sheet as a reference of the post-processing is the end portion on a side where the laminate film does not protrude from the end portion of each laminated flat cut sheet.

2. The processing method according to claim 1, wherein the post-processing is performed without reversing an orientation of leading and rear ends of each laminated flat cut sheet with respect to a conveying direction after the long laminate film is cut in the cutting.

3. The processing method according to claim 1, wherein the post-processing is performed after an orientation of leading and rear ends of each laminated flat cut sheet with respect to a conveying direction is reversed after the long laminate film is cut in the cutting.

4. The processing method according to claim 1, wherein the laminate film does not protrude from an end portion on a leading end side of each laminated flat cut sheet in a conveying direction after the long laminate film is cut in the cutting.

5. The processing method according to claim 1, wherein in the laminating, the laminate processing is performed on continuously conveyed flat cut sheets in a state where a rear end of a preceding flat cut sheet and a leading end of a following flat cut sheet are overlapped with each other.

6. The processing method according to claim 5, wherein in the cutting, the long laminate film, the preceding flat cut sheet, and the following flat cut sheet are cut at an upstream position and a downstream position in a conveying direction with respect to an overlap portion where the rear end of the preceding flat cut sheet and the leading end of the following flat cut sheet overlap each other.

7. The processing method according to claim 5,
wherein in the laminating, the laminate processing is performed in a state in which the leading end of the following flat cut sheet is overlapped to be under the rear end of the preceding flat cut sheet; and
wherein in the cutting, the long laminate film is cut within a predetermined length from the rear end of the preceding flat cut sheet.

8. The processing method according to claim 5,
wherein in the laminating, the laminate processing is performed in a state in which the leading end of the following flat cut sheet is overlapped above the rear end of the preceding flat cut sheet; and
wherein in the cutting, the long laminate film is cut within a predetermined length from the leading end of the following flat cut sheet.

9. The processing method according to claim 5, wherein in a case where a cutting position of the long laminate film to be cut in the cutting overlaps with an image part on the flat cut sheet, an amount of overlap between the rear end of the preceding flat cut sheet and the leading end of the following flat cut sheet can be changed to be a smaller amount in which the cutting position does not overlap with the image part.

10. The processing method according to claim 1, wherein in a case in which a plurality of types of post-processing are selectable and the laminate processing is to be executed, selection of a specific type of post-processing from among the plurality of types of post-processing is not allowed.

11. The processing method according to claim 1, wherein in a case in which a plurality of types of post-processing are selectable and specific post-processing among the plurality of types of post-processing is to be executed, the laminate processing is not selectable.

12. The processing method according to claim 1, wherein the post-processing includes at least one of cutting, folding, creasing, perforating, punching, half-cutting, binding, bookbinding, mealing, gluing, stacking, and reversing of leading and rear ends.

13. The processing method according to claim 1, wherein an image is formed on the flat cut sheet before the laminate processing.

14. The processing method according to claim 13, wherein in a case where a cutting position of the long laminate film to be cut in the cutting overlaps with an image part on the flat cut sheet, a position where the image is to be formed on the flat cut sheet can be shifted so that the cutting position does not overlap with the image part.

\* \* \* \* \*